United States Patent Office 3,647,830
Patented Mar. 7, 1972

3,647,830
6,6 - DIFLUORO-13β-ETHYL-17α-SUBSTITUTED-17β-HYDROXY - 4 - GONEN - 3-ONES AND THEIR LOWER ESTERS
George A. Boswell, Jr., Wilmington, Del., assignor to E. I. du Pont de Nemours and Company, Wilmington, Del.
No Drawing. Continuation-in-part of application Ser. No. 720,493, Apr. 11, 1968, now Patent No. 3,511,861. This application Jan. 22, 1970, Ser. No. 5,139
Int. Cl. C07c 169/20
U.S. Cl. 260—397.4                8 Claims

ABSTRACT OF THE DISCLOSURE

Described are steroid compounds of the formula

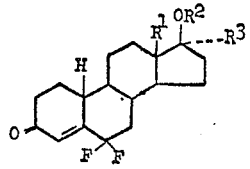

in which $R^1$ is ethyl, propyl, or isopropyl;
$R^2$ is hydrogen, the acetyl group, or the propionyl group;
$R^3$ is —CH≡CH, —C≡CCF$_3$, —CH=CH$_2$, —C≡CCH$_3$, —CH$_2$CH$_3$, —CH=CHCH$_3$, or —CH$_2$CH$_2$CH$_3$.

These compounds are highly active progestational agents.

RELATED APPLICATION

This application is a continuation-in-partof my copending application Ser. No. 720,493, filed Apr. 11, 1968, now U.S. Pat. No. 3,511,861.

BACKGROUND OF THE INVENTION

This invention relates to new 6,6-difluorosteroids, which are useful as progestational agents.

My copending application Ser. No. 720,493 is directed to certain 6,6-difluorosteroids in which there is in the C-3 position a hydroxyl, an alkoxyl, or an acyl group. These compounds are useful progestational agents.

One of the intermediates disclosed in my said copending application is 6,6-difluoro-13β-ethyl-17α-ethynyl-17β-hydroxygon-4-en-3-one, of Formula I,

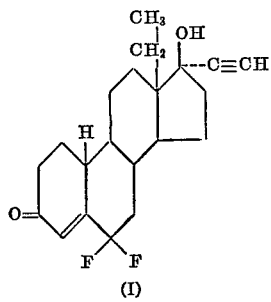

which is one of the compounds contemplated by the present invention.

My earlier U.S. Pat. 3,219,673 is directed to certain 6,6-difluorosteroids which have a good anabolic activity and a marked antigonadotrophic effect. This patent also discloses various derived products, including 17α-vinyl-6,6-difluoro-4-androstene - 3 - one-17β-ol and 17α-ethynyl-17β - propionyloxy-6,6-difluoro-4-androstene-3-one, which are lower homologs of certain compounds of the present invention, the difference being in the C-13 alkyl group.

SUMMARY OF THE INVENTION

It has now been discovered, according to this invention, that certain 17β-hydroxy-, acetoxy-, and propionyloxy-6,6-difluorosteroids have an exceptionally high short-term progestational activity. These compounds can be represented by the general Formula II,

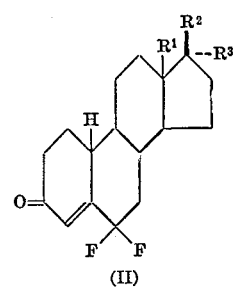

in which $R^1$ is ethyl, propyl, or isopropyl;
$R^2$ is hydrogen, the acetyl group, or the propionyl group; and
$R^3$ is one of the following groups: —C≡CH, —C≡CCH$_3$, —C≡CCF$_3$, —CH=CH$_2$, —CH$_2$—CH$_3$ —CH=CHCH$_3$, and —CH$_2$CH$_2$CH$_3$ These compounds are especially suitable for subcutaneous administration because of their fast action.

DETAILED DESCRIPTION OF THE INVENTION

It will be readily appreciated that 6,6-difluoro-17β-hydroxysteroids of the present invention are at the same time important intermediates in the preparation of the corresponding 17β-acetyl and -propionyl esters. These 17β-hydroxysteroids can be prepared by known methods, starting with available materials.

Thus, the diketone III (which can be made from a methyl ketone and diethyl oxalate by the method of Smith et al., J. Chem. Soc. 1963, 5072, ibid., 1964, 4472, 4487, and 4492) can be condensed under mild conditions with either compound IV or V to form the steroid precursor VI, which is readily cyclized. This reaction sequence is shown below in Scheme 1:

Scheme 1

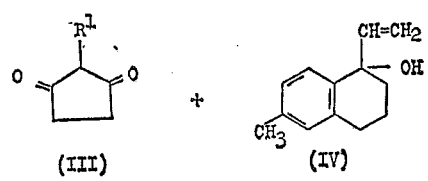

or

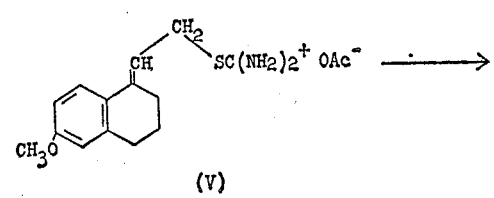

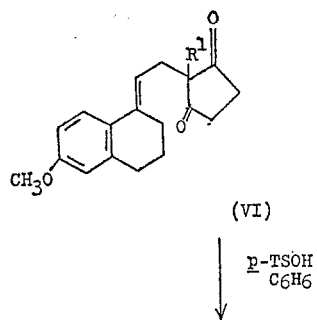

(VI)

↓ p-TSOH
   C₆H₆

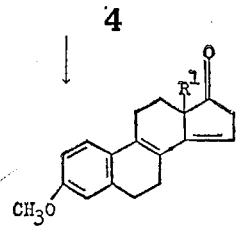

(VII)

In the above scheme, the reference character R¹ has the same meaning as in Formula II. Ac stands for the acetyl group, and TS for the toluenesulfonyl group. Compound IV is made from commercial 6-methoxy-1-tetralone and vinylmagnesium bromide, and it can be converted to Compound V with thiourea and acetic acid.

The keto group of Compound VII is reduced with tri-(t-butoxy)lithium aluminum hydride to the 17β-alcohol (VIII), which then is converted in several steps to the corresponding 17β - hydroxy - 13β - alkyl-4-gonen-3-one (XIII), as shown in Scheme 2, below:

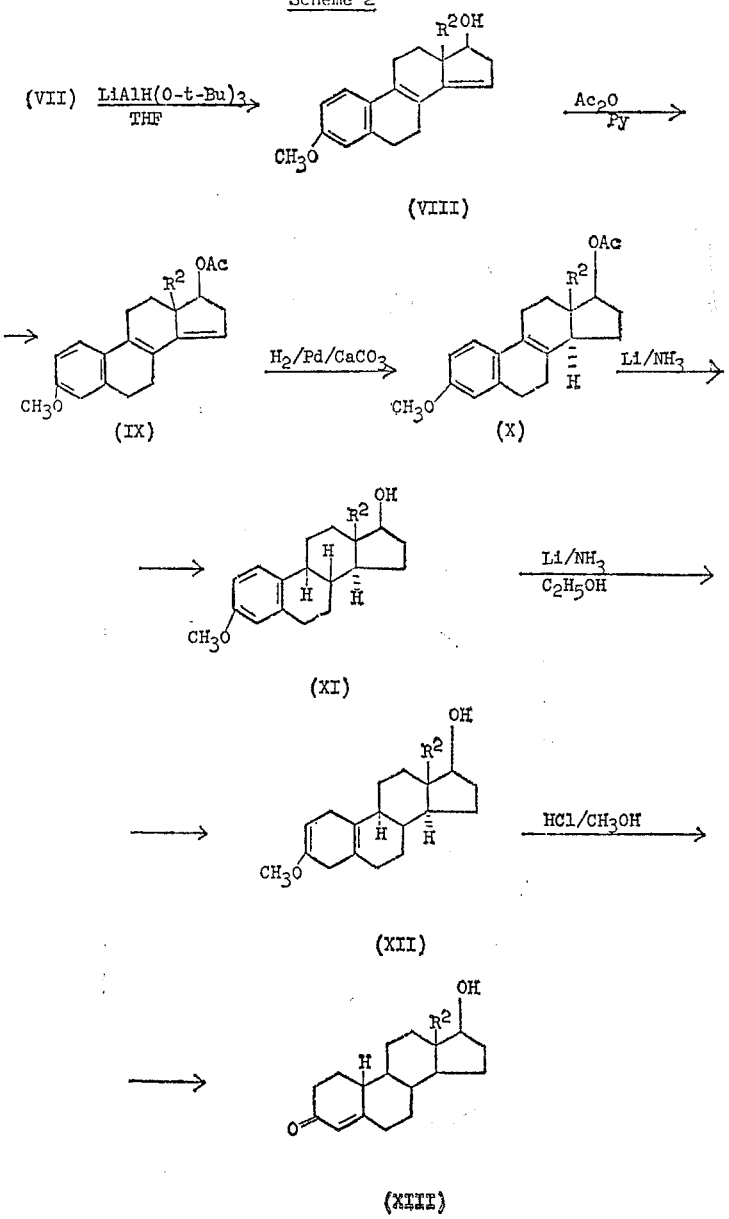

In the above reaction scheme, the meaning of R² is the same as before; t-Bus stands for tertiary butyl; Py stands for pyridine; and THF is an abbreviation of tetrahydrofuran. The catalytic hydrogenation of the ring D double bond in Compound IX can be about 95% stereospecific to give the 14α-isomer shown. The lithium/ammonia reduction of the 8(9) double bond in Compound X is stereospecific and gives Compound XI which has the trans-anti-trans B–C–D ring configuration.

Addition of ethanol to the reduction mixture containing Compound XI produces the enol XII which is hydrolyzed by strong acid and rearranges to Company XIII, having the desired trans-anti-trans B–C–D configuration.

In addition to the above Smith et al. references, other total synthesis methods have been reported as follows: Smith et al., Steroids 2, 319 (1963); ibid. 11, 649 (1968); O. H. Kuo, D. Taub, and N. L. Wendler, J. Org. Chem., 33, 3126 (1968); I. N. Nazarov, I. V. Torgov, and G. P. Verkholetova, Dokl. Akad. Nauk SSSR, 112, 1067 (1957) (English translation 112, 167 (1957)).

The 3-keto-17β - hydroxysteroid XIII is converted to the corresponding enol diacetate (XIV), which is treated with sodium borohydride to give the monoacetate (XV). This compound is reacetylated to (XVI), treated with a mixture of nitrosyl fluoride and nitrosyl fluoborate to give the 5α-fluoro-6-nitriminosteroid (XVII), and converted by activity Grade III neutral alumina to the corresponding 5α-fluoro-6-ketosteroid (XVIII). Compound XVIII reacts with sulfur tetrafluoride under mild conditions to give the 5α,6,6-trifluorosteroid, XIX, which is hydrolyzed, oxidized to the 3,17-diketone, XX, and dehydrofluorinated to the Δ⁴-6,6-difluoro-3,17-dione (XXI). The 3-ketal of Compound XXI reacts with the lithium salt or Grignard derivative of acetylene, propyne or 3,3,3-trifluoropropynyl to give the 17α-substituted steroid, which is hydrolyzed to the 3-keto-17β-hydroxysteroid (XXII) of the present invention. This sequence of reactions is illustrated below by the Scheme 3:

Scheme 3

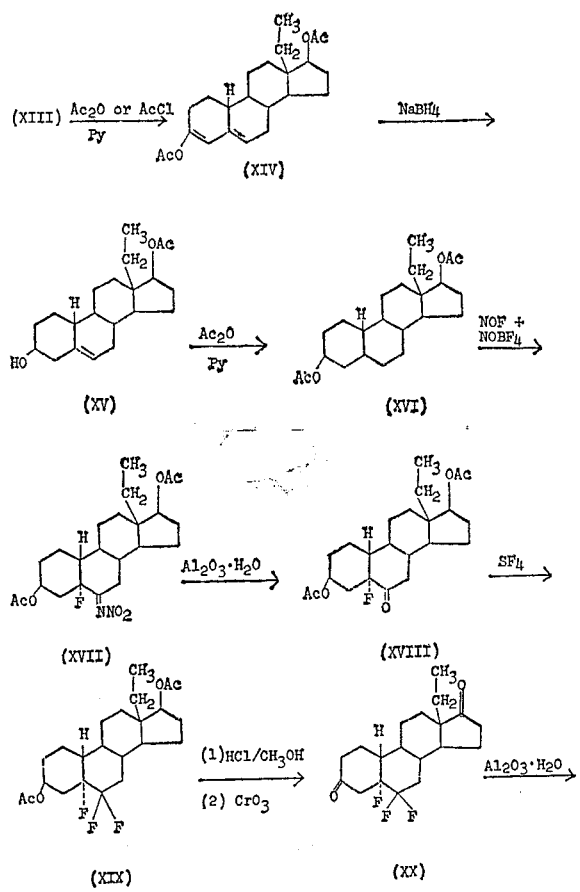

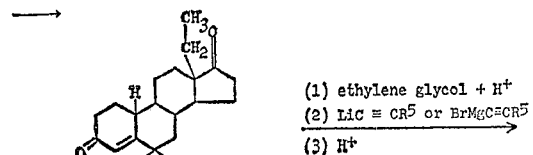

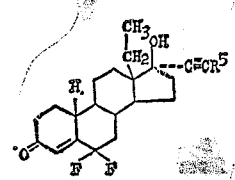

In the above scheme, R⁵ is hydrogen, methyl, or trifluoromethyl.

Compound XXII can be acylated to the 17β-acetyl or propionyl derivative. The triple bond at C-20 can be hydrogenated partly or fully to give the corresponding 17α-vinyl or 17α-alkyl derivatives.

This invention is now illustrated by the following representative examples of the preferred embodiments thereof. All temperatures are in degrees centigrade. The abbreviation TLC stands for thin layer chromatography, while IR stands for infrared spectroscopy.

EXAMPLE 1 dl - 6,6 - difluoro-13β-ethyl-17β-hydroxy-17α-ethynyl-4-gonen-3-one. (Formula II; R¹=ethyl; R²=hydrogen; R³=ethynyl)

A. dl-3β-17β-diacetoxy-13β-ethyl-4,6-gonadiene

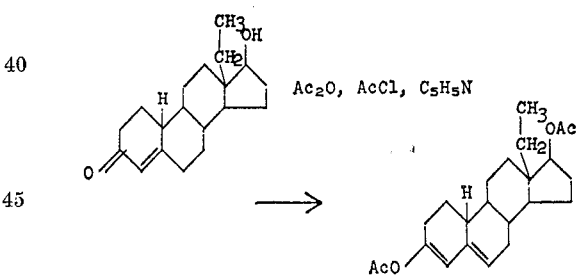

dl-18-methyl-19-nortestosterone (13.8 g.), (prepared by the method of Smith, J. Chem. Soc. 1964, 4472–4495), 120 ml. of acetic anhydride, 60 ml. of acetyl chloride and 6 ml. of pyridine was heated under reflux for two hours; the volatiles were removed, and the residue was crystallized from methanol to give 17.8 g. of dl-3β,17β-diacetoxy-13β-ethyl-4,6-gonadiene, M.P. 147–149°.

*Analysis.*—Calcd. for C₂₃H₃₂O₄: C, 74.16%; H, 8.66%, MW, 372.49. Found: C, 73.99%; H, 8.70%; MW; 372.

B. dl-3β-hydroxy-17β-acetoxy-13β-ethyl-5-gonene

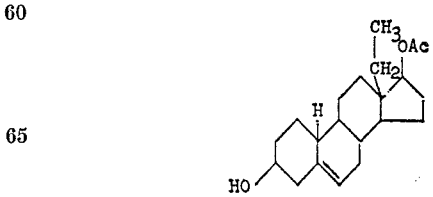

The product of step A (10 g.) was dissolved in 100 ml. of tetrahydrofuran, cooled to 0° and treated with 4.17 g. of cold sodium borohydride in 150 ml. of ethanol; and the mixture was stirred for 16 hours. The mixture was poured into ice water (500 ml.) and the solid (8.4 g.) removed by filtration. Crystallization from aqueous methanol gave the 17β-acetate, M.P. 138–160°.

*Analysis.*—Calcd. for $C_{21}H_{32}O_3$; C, 75.86%; H, 9.70%; MW 332.47. Found: C, 76.05%; H, 9.76%; MW 332.

C. dl-3β,17β-diacetoxy-13β-ethyl-5-gonene

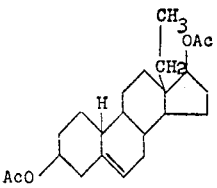

The product of step B was heated under reflux with 20 ml. of acetic anhydride and 20 ml. of pyridine for two hours and poured onto 350 g. of ice to give the diactate, which was recrystallized from methanol, M.P. 144.5–145.5°.

*Analysis.*—Calcd. for $C_{23}H_{34}O_4$ (percent): C. 73.76; H, 9.15. Found (percent): C, 73.40; H, 9.18.

D. dl-3β,17β-diacetoxy-5α-fluoro-13β-ethylgonan-6-one

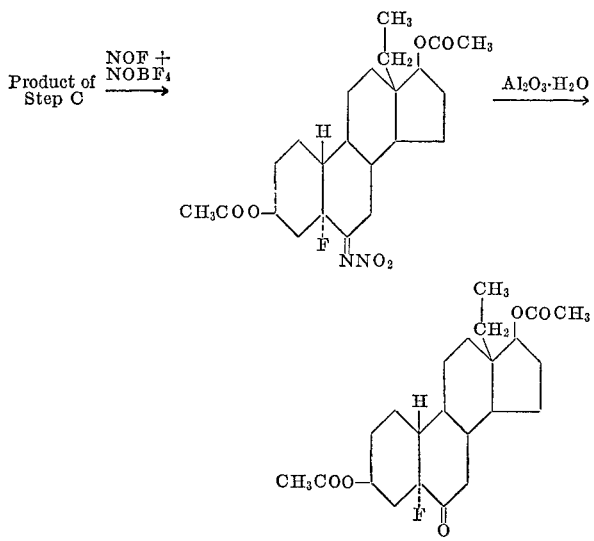

The product of step C (7.2 g.) in 80 ml. of methylene chloride was added slowly to a cooled (0°) solution of 4.67 g. of nitrosyl tetrafluoroborate in 120 ml. of glyme while a total of 6.37 g. of nitrosyl fluoride was introduced in a slow stream. The mixture was allowed to stand overnight, then it was poured into 500 ml. of brine, which was extracted twice with 100 ml. of methylene chloride. The organic solution was dried over sodium sulfate and the solvent evaporated to give 10.47 g. of dl-3β,17β-diacetoxy-5α-fluoro-6-nitrimino-13β-ethylgonane. The latter was dissolved in 30 ml. of benzene and passed through 100 g. of neutral alumina of activity grade III (containing 6% water) using 500 ml. of benzene as eluant. The steroid was rechromatographed using hexane, 3:1 by volume hexane:benzene, and benzene to give 6.94 g. of the dl - 3β,17β-diacetoxy-5α-fluoro-13β-ethylgonan-6-one, which was recrystallized from acetone-hexane, M.P. 150–154°.

*Analysis.*—Calcd. for $C_{23}H_{33}O_5F$ (percent): C, 67.62; H, 8.14. Found (percent): C, 67.82; H, 8.07.

E. dl-3β,17β-diacetoxy-5α,6,6-trifluoro-13β-ethylgonane

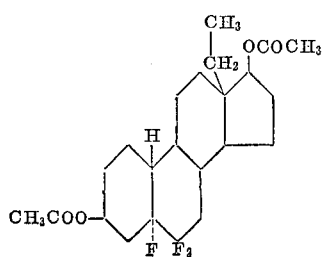

The product of step D, above, (3.2 g.) in 40 ml. of methylene chloride and one ml. of water was agitated with 80 g. of sulfur tetrafluoride at 25° for 10 hours. To the mixture was added 225 ml. of methylene chloride; the methylene chloride solution was then washed with water, 5% NaHCO₃, and brine and dried over MgSO₄. The solvent was evaporated and the product chromatographed on a "Florisil" column with hexane and 5% by volume acetone:hexane. The center cuts were combined and recrystallized from acetone (10 ml.) and hexane (25 ml.) to give the trifluorosteroid (2.61 g.), M.P. 169.5–171.5°.

*Analysis.*—Calcd. for $C_{23}H_{33}F_3O_4$ (percent): C, 64.17; H, 7.73. Found (percent): C, 64.37; H, 8.00.

F. dl-3β,17β-dihydroxy-5α,6,6-trifluoro-13β-ethylgonane

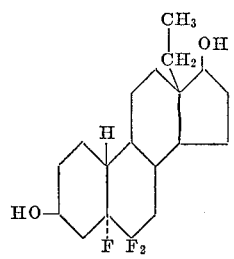

A solution of 2.45 g. of the preceding trifluorodiacetate from step E in 25 ml. of methanol and 3 ml. of conc. HCl was heated to reflux for one hour. Water was added, and the mixture was cooled and filtered. Crystallization from aqueous acetone gave the diol in 98% yield, M.P. 95° dec.

*Analysis.*—Calcd. for $C_{19}H_{29}R_3O_2$ (percent): C, 65.89; H, 8.49. Found (percent): C, 65.55; H, 8.66.

G. dl-5α,6,6-trifluoro-13β-ethylgona-3,17-dione

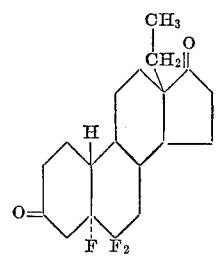

The diol from step F above (2.52 g.) was dissolved in 50 ml. of acetone and stirred for 30 minutes with 6 ml. of 8 N CrO₃. The mixture was diluted with hot water to give a precipitate of the dione in about 90% yield. Recrystallization from acetone-hexane gave colorless crystals, M.P. 189–190°.

*Analysis.*—Calcd. for $C_{19}H_{25}F_3O_2$ (percent): C, 66.65; H, 7.36. Found (percent): C, 67.07; H, 7.61.

H. dl-6,6-difluoro-13β-ethyl-4-gona-3,17-dione

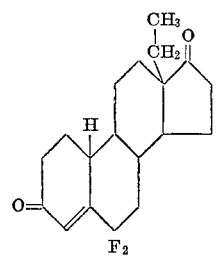

The dione obtained according to step G, above, (total of 3.8 g.) was dissolved in benzene and absorbed on a column of 150 g. of neutral alumina of grade III activity. After standing for 30 minutes, it was eluted with one liter of benzene. The benzene was evaporated and the residue crystallized from 90 ml. of acetone/hexane to give 2.87 g. of 6,6-difluoro-13β-ethyl-4-gona-3,17-dione, M.P. 171–172°.

*Analysis.*—Calcd. for $C_{19}H_{24}F_2O_2$ (percent): C, 70.78; H, 7.50. Found (percent): C, 72.50; H, 8.18.

I. dl-6,6-difluoro-13β-ethyl-4-gonen-3,17-dione - 3 - ethylene ketal

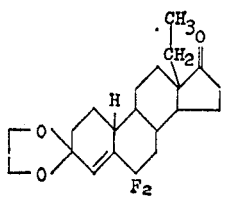

The above dione (2.5 g.) was heated under reflux (with a water separator) with 7.5 ml. of ethylene glycol, 2.5 g. of oxalic acid dihydrate and 100 ml. of benzene. After 6.5 hours, the mixture was extracted with 50 ml. of NaHCO₃ solution, 50 ml. of water and dried over Na₂SO₄

The ketal had M.P. 186–193°. The structure was confirmed by infrared and the reaction monitored by TLC (using cyclohexane/ethyl acetate).

*Analysis.*—Calcd. for $C_{21}H_{28}F_2O_3$ (percent): C, 68.83; H, 7.70. Found (percent): C, 68.86; H, 7.93.

J. 6,6-difluoro-13β-ethyl - 17β - hydroxy - 17α - ethynyl-4-gonen-3-one-3-ethylene ketal

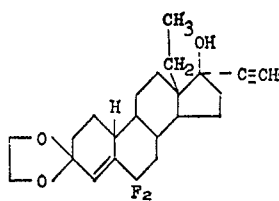

The monoketal of the product of step I, above, was dissolved in 20 ml. of dimethylacetamide and stirred under anhydrous conditions, while lithium acetylide-ethylene diamine complex (1 g.) was added, and acetylene was introduced for two hours. The mixture was decomposed with ice water, poured into brine and extracted with four 30-ml. portions of benzene, the extracts were washed with water and dried over Na₂SO₄. The benzene was evaporated, giving 1.15 g. of ketal.

K. dl-6,6 - difluoro - 1S3β - ethyl - 17β-hydroxy-17α-ethynyl-gonen-3-one

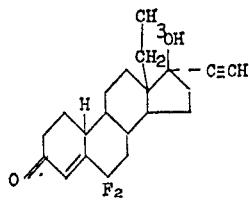

The crude ketal of step J, above, was stirred with 25 ml. of 90% acetic acid for three hours and poured into 50 ml. of water. The mixture was extracted with three 20 ml. portions of methylene chloride. The extracts were dried, and the solvent was removed by evaporation. The product was purified by preparative TLC on silica gel by cyclohexane/ethyl acetate (1/3) and recovered by acetone (500 ml.). Recrystallization from cyclohexane/ethyl acetate gave the gonenone, M.P. 163–164°.

*Analysis.*—Calcd. for $C_{21}H_{26}F_2O_2$ (percent): C, 72.39; H, 7.52. Found (percent): C, 72.14; H, 7.43.

EXAMPLE 2 dl-6,6 - difluoro - 13β - ethyl-17β-acetoxy-17α-ethynyl-4-gonen-3-one (Formula II, $R^1$=ethyl; $R^2$=acetyl; $R^3$=—C≡CH)

A mixture of 0.01 mole of the 17β-hydroxysteroid product of Example 1 with 20 ml. of pyridine and 20 ml. of acetic anhydride is heated under nitrogen at 100° C. with good stirring for a period of six hours. The starting steroid dissolves during this time in the acetylating mixture. The solution is poured into an ice-water mixture, and the product is filtered and washed with ice-cold-water. The crude material is purified by chromatography on Florisil®, followed by recrystallization from a mixture of acetone and hexane.

The corresponding propionyl ester, 6,6 - difluoro-13β-ethyl-17β - propionoxy - 17α-ethylnyl-4-gonen-3-one, can be made by the same technique, except that propionic anhydride is used instead of acetic anhydride.

The acylation of the 17β-hydroxy group can also be accomplished by stirring the 17β - hydroxysteroid with the acid anhydride in the presence of p-toluenesulfonic acid, as described by Mills, Ringold, and Djerassi, J. Am. Chem. Soc. 80, 6118 (1958).

EXAMPLE 3 dl-6,6-difluoro - 13β - ethyl - 17β - hydroxy-17α-vinyl-4-gonen-3-one (Formula II; $R^1$=ethyl; $R^2$=hydrogen $R^3$=—CH=CH₂)

The 17β-hydroysteroid (0.01 mole) of Example 1 is dissolved in ethyl acetate (150 ml.) and hydrogenated in a Parr shaker at 25° in the presence of a 5% palladium-calcium carbonate catalyst (0.5 g.) containing quinoline and lead, 0.01 mole of hydrogen being absorbed. The catalyst can be prepared according to the procedure of Lindlar, Helv. Chem. Acta 35, 446 (1952); or a variation thereof, such as Bowers, Ringold, and Denot, J. Am. Chem. Soc. 80, 6115 (1958), which employs palladium-calcium carbonate, and pyridine. These catalysts reduce the triple bond to the double bond only with the absorption of one mole of hydrogen per mole of streoid. The vinyl compound is recovered from the ethyl acetate solution, which first is filtered to remove the catalyst, then evaporated, and the residue is purified by chromatography on Grade III alumina. The crystalline product finally is recrystallized from a mixture of acetone and hexane.

More energetic hydrogenation of the 17α-ethynyl-steroid produces the 17α-ethyl compound. Such a reduction can be conveniently carried out in ethanol solution in the presence of palladium on charcoal. The hydrogenation of 0.01 mole of steroid in ethyl acetate (150 ml.) in a Parr shaker at 25° in the presence of 5% palladium on charcoal (0.5 g.) is stopped after 0.02 mole of hydrogen has been absorbed. The same isolation procedure can be used. This general hydrogenation technique is reported by Hershberg, Oliveto, Gerold, and Johnson, J. Am. Chem. Soc. 73, 5073 (1951).

EXAMPLE 4 dl-6,6-difluoro - 13β - ethyl - 17β - hydroxy-17α-(3,3,3-trifluoropropynyl)-4-gonen-3-one (Formula II; $R^1$=ethyl; $R^2$=hydrogen; $R^3$=—C≡CCF₃)

A solution of dl-6,6-difluoro-13β-ethyl-4-gonene-3,17-dione-3-ethylene ketal (0.01 mole), the product of the step (I) of Example 1, in tetrahydrofuran (100 ml.) is added to a solution of a Grignard reagent prepared by saturating an ether solution of ethylmagnesium bromide (0.025 mole) with gaseous 3,3,3-trifluoropropynyl and filtering in the absence of air and moisture. The combined solution is stirred for six hours at 25° C.; the excess Grignard reagent is decomposed with water, and the product is recovered by extraction with dichloromethane. Pure 6,6-difluoro - 13β - ethyl-17β-hydroxy-17α-(3,3,3-tifluoropropynyl)-4-gonen-3-one is obtained by chromatography on Activity Grade III neutral alumina.

Alternatively, this compound can be made from the 17α-ethynyl alcohol of Example 1 by the following reaction sequence:

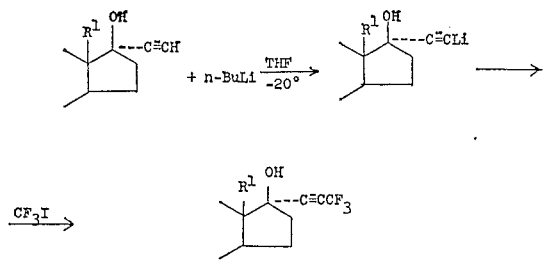

When propyne is used in place of acetylene in the step (J) of Example 1, dl-6,6-difluoro-13β-ethyl-17β-hydroxy-17α-(1-propynyl)-4-gonen-3-one is produced. Reduction as described in Example 3 yields dl-6,6-difluoro-13β-ethyl-17β - hydroxy-17α-(1-propenyl)-4-gonen-3-one and dl-6,6-difluoro-13β-ethyl - 17β - hydroxy - 17α - propyl-4-gonen-3-one.

By using the above-described techniques, and starting with dl-18-ethyl- or dl-18,18-dimethyl-19-nortestosterone (prepared by the method of Smith, J. Am. Chem. Soc., 1964, 4472–4495), it is possible to prepare the corresponding 13β-propyl- and 13β-isopropylsteroids, i.e. compounds of Formula II in which $R^1$ is propyl or isopropyl. Representative 13β-propyl- and 13β-isopropylsteroids of this invention include:

6,6-difluoro-13β-propyl - 17β - hydroxy-17α-ethynyl-4-gonen-3-one, 6,6 - difluoro-13β-isopropyl-17β-hydroxy-17α-ethynyl-4-gonen-3-one, 6,6-difluoro - 13β - propyl - 17β - acetoxy-17α-ethynyl-4-gonen-3-one, 6,6-difluoro-13β-isopopyl - 17β - acetoxy-17α-ethynyl-4-gonen-3-one, 6,6 - difluoro-13β-propyl-17β-propionyloxy-17α-ethynyl-4-gonen-3-one, 6,6-difluoro - 13β - isopropyl - 17β - propionyloxy-17α-ethynyl-4-gonen-3-one, 6,6-difluoro-13β-propyl - 17β - hydroxy-17α-propynyl-4-gonen-3-one, 6,6 - difluoro - 13β - propyl-17β-hydroxy-17α-trifluoropropynyl-4-gonen-3-one, 6,6-difluoro - 13β - popyl - 17β - acetoxy-17α-propynyl-4-gonen-3-one, 6,6-difluoro - 13β - isopropyl - 17β - propionyloxy-17α-trifluoropropynyl-4-gonen-3-one, 6,6-difluoro - 13β - propyl - 17β - acetoxy-17α-vinyl-4-gonen-3-one, and 6,6-difluoro-13β-propyl - 17β - propionyloxy-17α-ethyl-4-gonen-3-one.

The streoid compounds of this invention are useful as progestational agents, which show a high activity in short-term bioassays. The following test procedure is employed:

Immatue female rabbits weighing 800–1000 grams are estrogen-primed by means of daily subcutaneous doses of 5 μg. of estradiol benzoate for six consecutive days. Beginning on the seventh day for five consecutive days, the new materials of this invention are administered once daily in 0.5% tragacanth by subcutaneous injection or by gavage. The rabbits are autopsied on the twelfth day. Sections of the uterine tissue are examined microscopically and the uterine weight, ovarian weight and degree of progestational reaction in the endometrium are determined and compared to norethindrone with a total oral dose of 0.02 mg.

The compound of Example 1, i.e., dl-6,6-difluoro-13β-ethyl-17β-hydroxy-17α-ethynyl-4-gonen-3-one, was found in duplicate tests to be 6 to 8 times as active as norethindrone.

The embodiments of the invention in which an exclusive property or privilege is claimed are defined as follows:

1. A steroid compound having the general formula

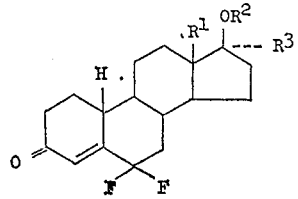

in which $R^1$ is a member of the class: ethyl, propyl, and isopropyl;
$R^2$ is hydrogen, the acetyl group, or the propionyl group; and
$R^3$ is selected from the class: —C≡CH, —C≡C—CH₃, —C≡C—CF₃, —CH=CH₂, —CH₂—CH₃,

—CH=CHCH₃ and CH₂CH₂CH₃.

2. 6,6-difluoro-13β-ethyl-17β-hydroxy-17α-ethynyl - 4-gonen-3-one, the compound of claim 1 in which $R^1$ is ethyl; $R^2$ is hydrogen; and $R^3$ is —C≡CH.

3. 6,6-difluoro-13β-ethyl-17β-acetoxy-17α - ethynyl - 4-gonen-3-one, the compound of claim 1 in which $R^1$ is ethyl; $R^2$ is the acetyl group; and $R^3$ is —C≡CH.

4. 6,6-difluoro-13β-ethyl-17β-hydroxy-17α - vinyl - 4-gonen-3-one, the compound of claim 1 in which $R^1$ is ethyl; $R^2$ is hydrogen; and $R^3$ is —CH=CH₂.

5. 6,6-difluuoro-13β-ethyl-17β-hydroxy-17α-(3,3,3 - trifluoropropynyl)-4-gonen-3-one, the compound of claim 1 in which $R^1$ is ethyl; $R^2$ is hydrogen; and $R^3$ is

—C≡CCF₃

6. 6,6-difluoro-13β-ethyl-17β-hydroxy-17α-(1-propynyl)-4-gonen-3-one, the compound of claim 1 in which $R^1$ is ethyl; $R^2$ is hydrogen; and $R^3$ is —C≡C—CH₃.

7. 6,6-difluoro-13β-ethyl-17β-hydroxy-17α-(1-propenyl)-4-gonen-3-one, the compound of claim 1 in which $R^1$ is ethyl; $R^2$ is hydrogen; and $R^3$ is —CH=CH—CH₃.

8. 6,6-difluoro-13β-ethyl-17β-hydroxy-17α-propyl - 4-gonen-3-one, the compound of claim 1 in which $R^1$ is ethyl; $R^2$ is hydrogen; and $R^3$ is —CH₂CH₂CH₃.

References Cited

UNITED STATES PATENTS

| | | | |
|---|---|---|---|
| 3,202,686 | 8/1965 | Hughes et al. | 260—397.45 |
| 3,467,652 | 9/1969 | Hughes et al. | 260—239.55 |
| 3,471,531 | 10/1969 | Hughes et al. | 260—397.5 |
| 3,219,673 | 11/1965 | Boswell | 260—397.3 |

HENRY A. FRENCH, Primary Examiner

U.S. Cl. X.R.

260—239.55 C, 397.3, 397.45, 397.5, 999